United States Patent
Liu et al.

(10) Patent No.: US 9,705,422 B2
(45) Date of Patent: Jul. 11, 2017

(54) SYSTEM AND METHOD FOR SOFT SWITCHING POWER INVERSION

(71) Applicant: General Electric Company, Schenectady, NY (US)

(72) Inventors: Xiaohu Liu, Schenectady, NY (US); Luis Jose Garces, Schenectady, NY (US); Maja Harfman Todorovic, Niskayuna, NY (US); Mohammed Agamy, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 83 days.

(21) Appl. No.: 14/722,251

(22) Filed: May 27, 2015

(65) Prior Publication Data

US 2016/0352253 A1    Dec. 1, 2016

(51) Int. Cl.
*H02M 7/538* (2007.01)
*H02M 7/5387* (2007.01)
*H02M 1/00* (2006.01)

(52) U.S. Cl.
CPC .......... *H02M 7/53871* (2013.01); *H02M 2001/0058* (2013.01)

(58) Field of Classification Search
CPC .............. H02M 7/48–2007/4811; H02M 7/537–7/5395
See application file for complete search history.

(56) References Cited

U.S. PATENT DOCUMENTS

| 5,875,103 A | 2/1999 | Bhagwat et al. |
| 6,396,722 B2 | 5/2002 | Lin |
| 8,199,544 B2 | 6/2012 | Krause et al. |
| 2002/0034083 A1 | 3/2002 | Ayyanar et al. |
| 2008/0247194 A1* | 10/2008 | Ying ................... H02M 3/3376 363/17 |

(Continued)

OTHER PUBLICATIONS

J. Huang, Y. Wang, Y. Gao, W. Lei and N. Li, "Modified unified PWM control to operate the dual active bridge converters under ZVS in the whole load range," ECCE Asia Downunder (ECCE Asia), 2013 IEEE, Melbourne, VIC, 2013, pp. 620-625.*

(Continued)

*Primary Examiner* — Harry Behm
*Assistant Examiner* — Peter Novak
(74) *Attorney, Agent, or Firm* — Ziolkowski Patent Solutions Group, SC; Jean K. Testa

(57) ABSTRACT

A power inversion system includes an input and output coupleable to a DC power and an AC load, respectively, and a power inverter including a plurality of phase legs each having two bridge legs coupled in parallel with at least two switch and antiparallel diode pairs coupled in series. The system also includes a plurality of inductors, with at least one inductor coupled between a midpoint of each bridge leg and an LCL filter, the inductors in each phase leg being magnetically coupled. The system further includes a control system to drive the power inverter in a soft switching configuration, the control system programmed to output a switching signal to the power inverter according to a duty cycle and a phase shift angle, determine a value of the duty cycle, and optimize the phase shift angle of the power inverter based on the value of the duty cycle.

19 Claims, 8 Drawing Sheets

(56) References Cited

U.S. PATENT DOCUMENTS

2009/0196072 A1* 8/2009 Ye .................... H02M 7/493
363/17
2010/0244575 A1    9/2010 Coccia et al.
2011/0299311 A1* 12/2011 Zhu .................... H02M 1/126
363/132
2012/0026754 A1    2/2012 Ye
2014/0376269 A1* 12/2014 Johnson ............ H02M 3/33507
363/17

OTHER PUBLICATIONS

Lai et al., "A High Efficiency Two-Phase Interleaved Inverter for Wide Range Output Waveform Generation," Energy Conversion Congress and Exposition (ECCE), 2012 IEEE, Sep. 2012, pp. 4533-4537.

Nicy et al., "Solar Based Stand Alone High Performance Interleaved Boost Converter with Zvs and Zcs," IOSR Journal of Electrical and Electronics Engineering (IOSR-JEEE), May-Jun. 2013, vol. 5, Issue 4, pp. 22-28.

Cho et al., "Novel Zero-Voltage-Transition PWM Multiphase Converters," IEEE Transactions on Power Electronics, Jan. 1998, vol. 13, No. 1, pp. 152-159.

"Interleaved Soft-Switching Boost AC/DC Converter Used in Plug-In Electric Vehicles," Pantech, pp. 1-4.

Boillat et al., "Modeling and Experimental Analysis of a Coupling Inductor Employed in a High Performance AC Power Source," Power Electronic Systems (PES) Laboratory, Proceedings of the International Conference on Renewable Energy Research and Applications (ICRERA 2012), Nagasaki, Japan, Nov. 22-14, 2012, pp. 1-19.

* cited by examiner

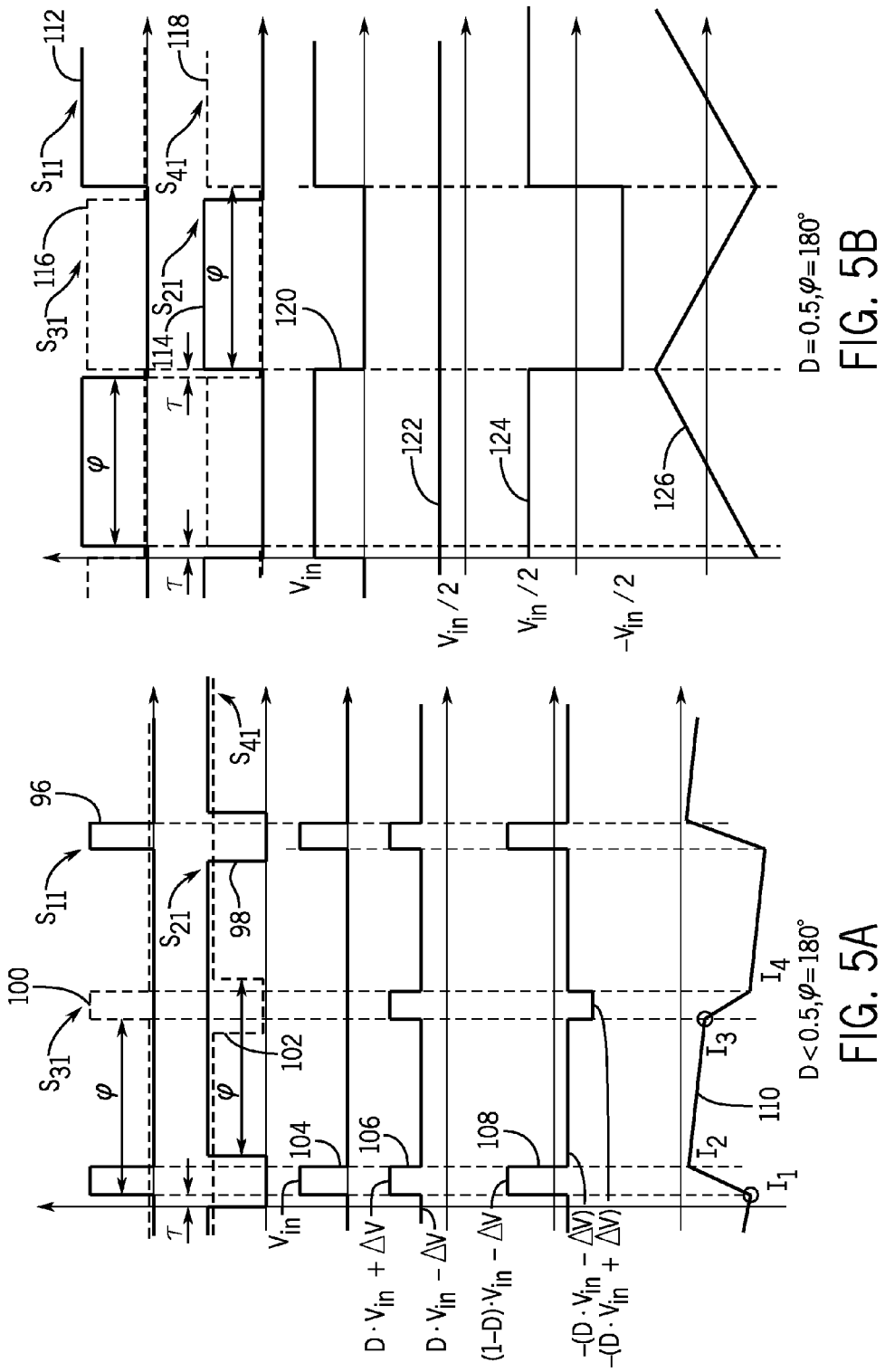

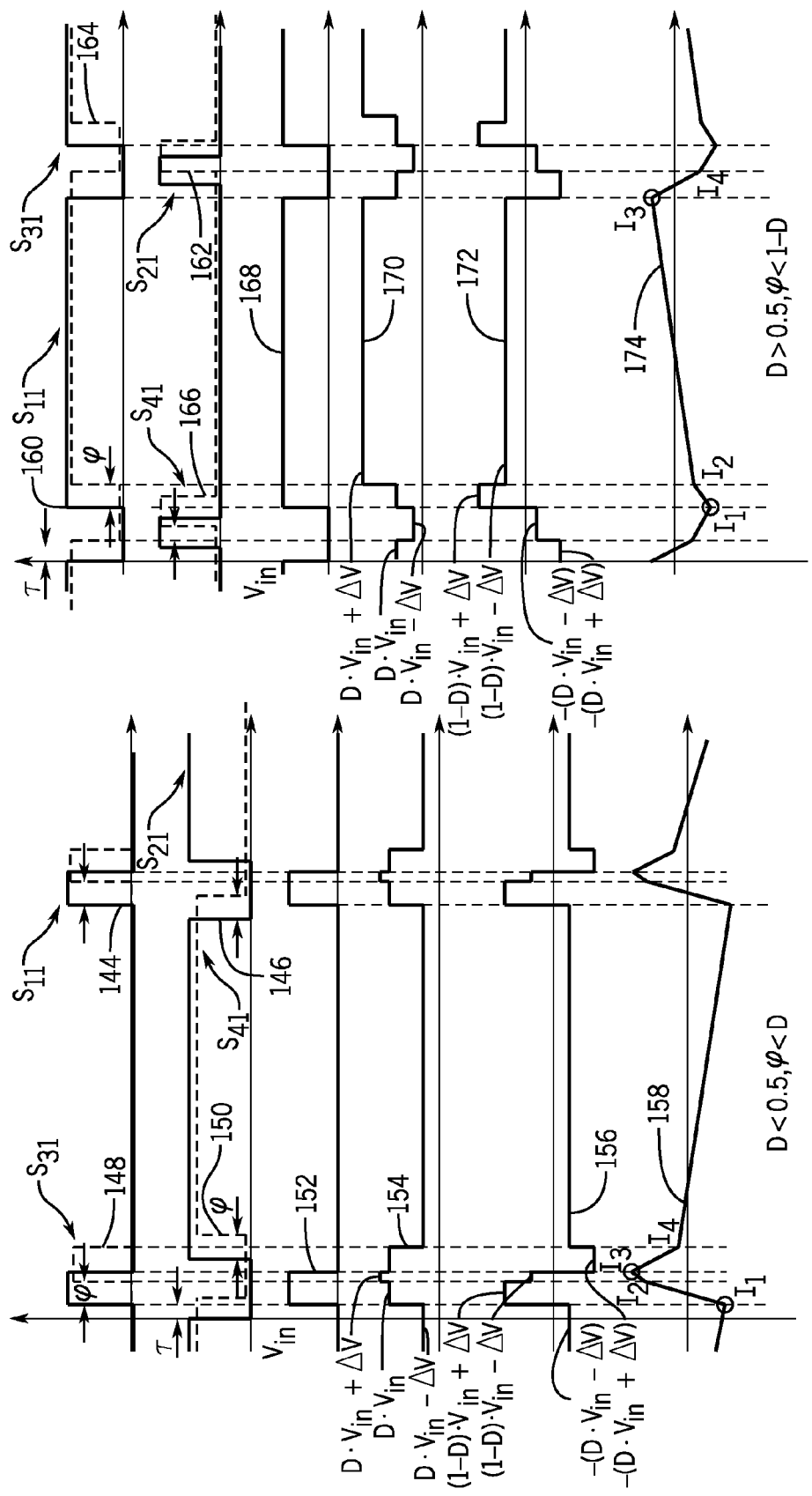

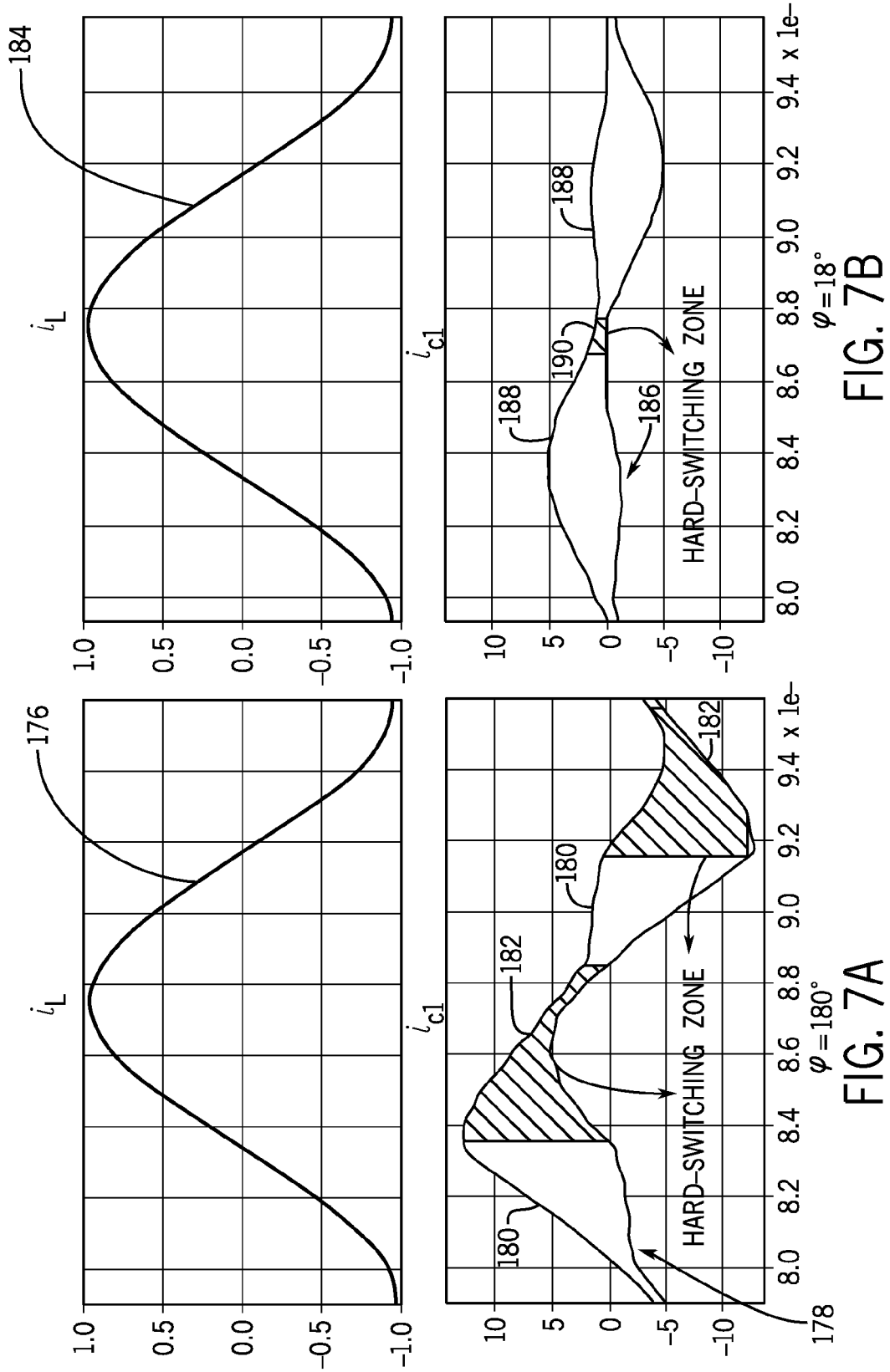

SYSTEM AND METHOD FOR SOFT SWITCHING POWER INVERSION

BACKGROUND OF THE INVENTION

The present invention relates generally to soft switching power inversion and, more particularly, to soft switching power inversion systems for grid interface applications and methods of operation thereof that provide for high efficiency, high frequency switching operation of the power inversion systems.

Inverters are common circuit elements within power electronic circuits for converting a DC power to an AC power. Existing inverters include hard switching and soft switching inverter controls. Hard switching inverter controls are generally considered to be easier to implement than soft switching inverter controls. However, hard switching inverters generally have more losses than soft switching inverters. For example, switching losses in hard switching inverters are generally higher than switching losses in soft switching inverters. Switching losses increase with increasing switching frequency, so switching frequency must be limited to avoid a large amount of switching losses. Hard switching inverters have these greater losses because the transistor is turned on when there is still a voltage across it and/or turned off when there is still a current flowing through it.

Soft switching inverters help to alleviate switching losses by switching the transistor on when the voltage across it reaches zero (zero voltage switching) and/or switching the transistor off when the current flowing through it reaches zero (zero current switching). Soft switching inverters also help to alleviate loss associated with the reverse recovery of the inverter diodes. In many soft switching inverter controls, the phase shift angle is fixed at 180 degrees to obtain a doubled output frequency ripple. However, that 180 degree phase shift angle may cause at least one switch to operate under hard switching inverter controls. As stated above, the hard switching inverter controls can cause a large amount of switching losses, which limit the switching frequency, even with the rest of the inverter switches operating under soft switching inverter controls.

Some soft switching inverters use a phase shift angle less than 180 degrees by calculating the phase shift angle in real time based on the high speed sampling of circulating current. However, these soft switching inverters have a limited soft switching range because the duty cycle is limited. Also, these soft switching inverters must still incorporate large magnetic components because the reduction of the phase shift angle is not enough to reduce the magnetic flux present in the inverter.

It would therefore be desirable to provide a soft switching inverter and method of operation thereof that provides high efficiency operation of the inverter at high frequency switching with an unlimited soft switching range.

BRIEF DESCRIPTION OF THE INVENTION

The present invention provides a power inversion system and method for soft switching operation thereof. Controls are applied to the switches of an inverter in the power inversion system such that the phase shift angle of the controls is variable.

In accordance with one aspect of the invention, a power inversion system having an input coupleable to a DC power and an output coupleable to an AC load includes a power inverter including a plurality of phase legs, each phase leg including two bridge legs coupled in parallel, each bridge leg including at least two switch and antiparallel diode pairs coupled in series. The power inversion system also includes a plurality of inductors with at least one inductor coupled between a midpoint of each bridge leg and an LCL filter, the inductors in each phase leg being magnetically coupled. The power inversion system further includes a control system operable to drive the power inverter in a soft switching configuration, the control system programmed to output a switching signal to the power inverter according to a duty cycle and a phase shift angle, determine a value of the duty cycle, and optimize the phase shift angle of the power inverter based on the value of the duty cycle.

In accordance with another aspect of the invention, a method of operating an interleaved inverter includes inputting a DC power into the interleaved inverter and converting the DC power into an AC power with the interleaved inverter via a control system programmed to output a soft switching modulation signal to the plurality of switches of the interleaved inverter according to a duty cycle and a phase shift angle, identify the value of the duty cycle in the soft switching modulation signal, set the phase shift angle of the interleaved inverter using a first method if the duty cycle is less than or equal to 0.5 (50%), set the phase shift angle of the interleaved inverter using a second method different from the first method if the duty cycle is greater than 0.5 (50%). The method also includes outputting the AC power from the interleaved inverter to an AC load or AC grid.

In accordance with yet another aspect of the invention, a control system for operating a power inverter is programmed to output a soft switching signal to the power inverter according to a duty cycle and a phase shift angle, determine the value of the duty cycle, and optimize the phase shift angle of the power inverter according to a first method if the duty cycle is less than or equal to 0.5 (50%) and according to a second method if the duty cycle is greater than 0.5 (50%).

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings:

FIGS. 5A-5C are diagrams of the operation of the phase leg of FIG. 4 with a phase shift angle of 180 degrees and varying duty cycle.

FIGS. 6A-6B are diagrams of the operation of the phase leg of FIG. 4 with a phase shift angle of 36 degrees and varying duty cycle, according to an embodiment of the invention.

FIG. 7A is a diagram showing the hard switching zone for the phase leg of FIG. 4 for a phase shift angle of 180 degrees.

FIG. 7B is a diagram showing the hard switching zone for the phase leg of FIG. 4 for a phase shift angle of 18 degrees, according to an embodiment of the invention.

DETAILED DESCRIPTION OF THE PREFERRED EMBODIMENTS

The embodiments of the invention set forth herein relate to a power inversion system and method of operation thereof that provides for high efficiency and high frequency operation of an inverter in the power inversion system. An interleaved inverter is provided that includes a plurality of switches (for example, MOSFETs) therein that control voltage and current output to an AC load (for example, a grid), with a control system in the power inversion system applying a modulation signal to control operation of the switches of the inverter to modulate a voltage provided to the AC load.

Figure 1:
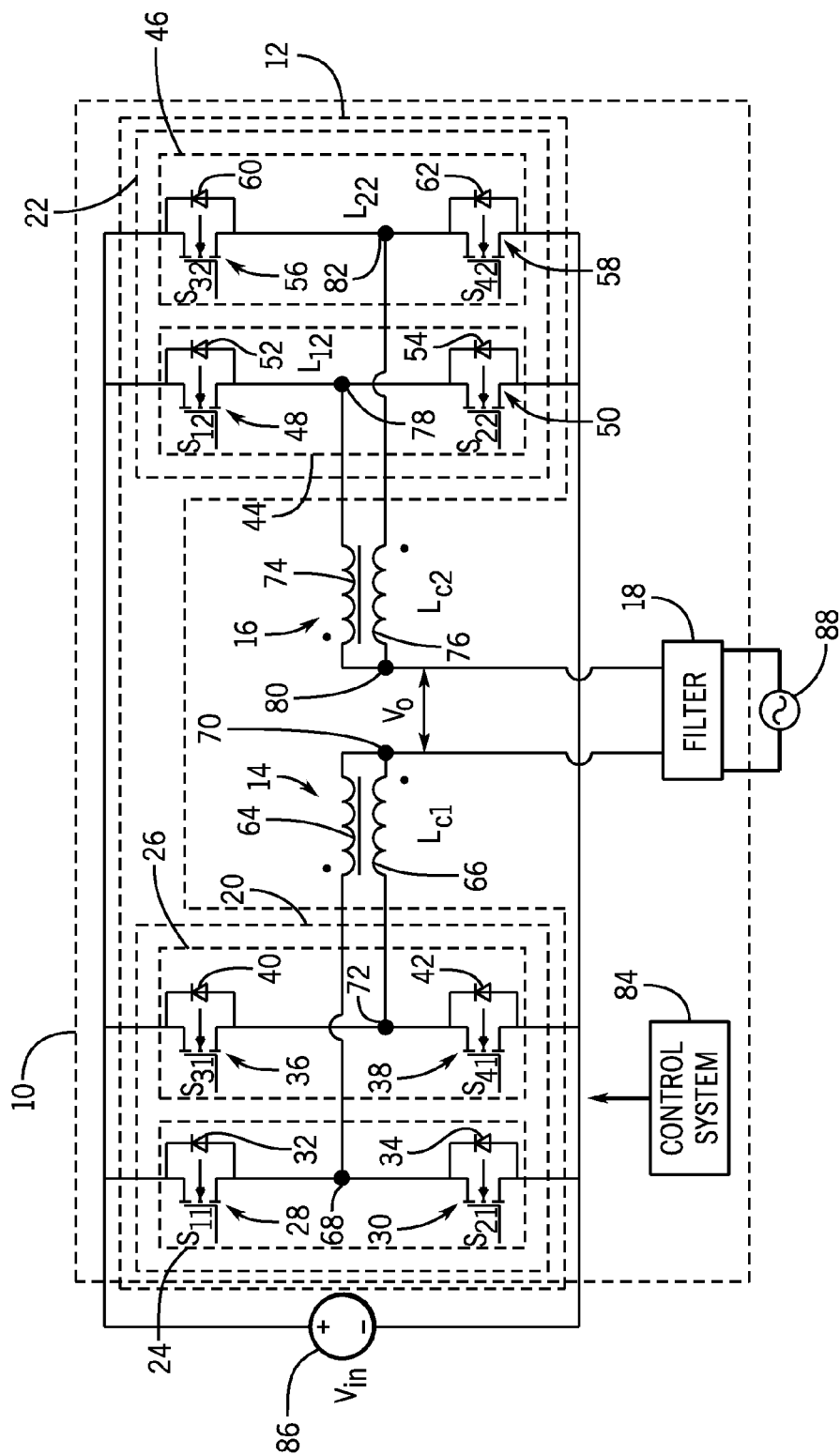
FIG. 1 is a schematic view of a single phase power inversion system, according to an embodiment of the invention.

Referring to FIG. 1, a single phase power inversion system 10 is shown according to an embodiment of the invention. Single phase power inversion system 10 includes an inverter 12; two magnetically coupled inductors 14 ($L_{c1}$), 16 ($L_{c2}$); and an LCL filter 18. The inverter 12 includes two phase legs 20, 22 coupled in parallel. Phase leg 20 includes two bridge legs 24, 26 coupled in parallel. Bridge leg 24 includes two switch and antiparallel diode pairs 28, 30 coupled in series. Switch and antiparallel diode pair 28 includes a switch $S_{11}$ and an antiparallel diode 32. Switch and antiparallel diode pair 30 includes a switch $S_{21}$ and an antiparallel diode 34. Bridge leg 26 includes two switch and antiparallel diode pairs 36, 38 coupled in series. Switch and antiparallel diode pair 36 includes a switch $S_{31}$ and an antiparallel diode 40. Switch and antiparallel diode pair 38 includes a switch $S_{41}$ and an antiparallel diode 42.

Phase leg 22 includes two bridge legs 44, 46 coupled in parallel. Bridge leg 44 includes two switch and antiparallel diode pairs 48, 50 coupled in series. Switch and antiparallel diode pair 48 includes a switch $S_{12}$ and an antiparallel diode 52. Switch and antiparallel diode pair 50 includes a switch $S_{22}$ and an antiparallel diode 54. Bridge leg 46 includes two switch and antiparallel diode pairs 56, 58 coupled in series. Switch and antiparallel diode pair 56 includes a switch $S_{32}$ and an antiparallel diode 60. Switch and antiparallel diode pair 58 includes a switch $S_{42}$ and an antiparallel diode 62.

Inductor 14 includes two magnetically coupled inductors 64, 66. Inductor 64 is coupled between bridge leg 24 at a node 68 between switch and antiparallel diode pairs 28, 30 and a node 70 coupled to LCL filter 18. Inductor 66 is coupled between bridge leg 26 at a node 72 between switch and antiparallel diode pairs 36, 38 and node 70. Inductor 16 includes two magnetically coupled inductors 74, 76. Inductor 74 is coupled between bridge leg 44 at a node 78 between switch and antiparallel diode pairs 48, 50 and a node 80 coupled to LCL filter 18. Inductor 76 is coupled between bridge leg 46 at a node 82 between switch and antiparallel diode pairs 56, 58 and node 80.

Power inversion system 10 also includes a control system 84. Control system 84 operates or drives inverter 12 in a soft switching configuration, such as zero voltage switching or zero current switching. Control system 84 drives inverter 12 by switching switches $S_{11}$, $S_{21}$, $S_{31}$, $S_{41}$, $S_{12}$, $S_{22}$, $S_{32}$, $S_{42}$ according to the soft switching configuration, which includes a duty cycle (D) and a phase shift angle, to control the voltage and current output of power inversion system 10. Control system 84 may include a proportional integral controller or any other type of suitable controller or control circuitry for operating inverter 12.

An input to single phase power inversion system 10 may be a DC power source 86. DC power source 86 may include any DC power source known in the art, including any distributed energy resources (DER) outputting a DC power. As non-limiting examples, DC power source 86 may include a DER power source such as a hydroelectric power source, a biomass power source, a biogas power source, a solar power source, a wind power source, and/or a geothermal power source. DC power source 86 may also include an energy storage device, as another non-limiting example. An output of single phase power inversion system 10 is an AC load 88. AC load 88 may include any suitable AC load. As a non-limiting example, AC load 88 may include a single phase grid.

While the power inversion system shown in FIG. 1 is a single phase power inversion system, the invention should not be limited to a single phase power inversion system. In some embodiments, the power inversion systems of the invention may include three phase power inversion systems for inverting a DC power into a three phase AC power for a three phase AC load. A three phase power inversion system would simply require a third phase leg coupled in parallel with the other two phase legs 20, 22 and a third inductor coupled between the third phase leg and the LCL filter 18.

A zero voltage switching control configuration in accordance with an embodiment of the invention will now be described with reference to bridge leg 24 of phase leg 20 of inverter 12 of power inversion system 10. While reference is made only to one bridge leg 24 of inverter 12, the details of the zero voltage switching control configuration may be extrapolated to the other bridge legs 26, 44, 46 of inverter 12.

Figure 3:
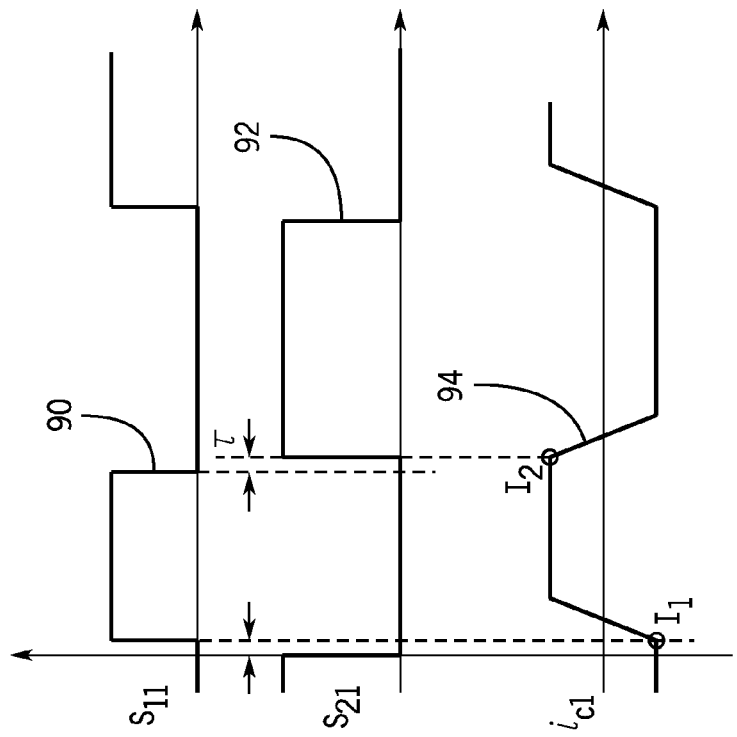
FIG. 3 is a diagram depicting control of the switches of the bridge leg of FIG. 2 for zero voltage switching, according to an embodiment of the invention.
Figure 2:
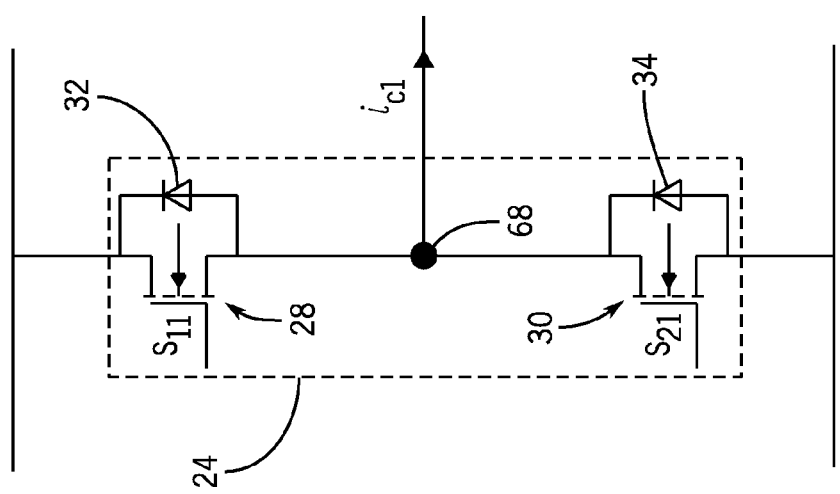
FIG. 2 is a schematic of a bridge leg of the inverter of FIG. 1, according to an embodiment of the invention.

Referring now to FIG. 2, bridge leg 24 of phase leg 20 of inverter 12 of power inversion system 10 is shown. Bridge leg 24 provides for a current $i_{c1}$ flowing from node 68 during operation of power inversion system 10. Referring now to FIG. 3, a diagram depicting control of switches $S_{11}$, $S_{21}$ of bridge leg 24 of FIG. 2 for zero voltage switching is shown according to an embodiment of the invention. As shown by switching waveforms 90, 92 for switches $S_{11}$, $S_{21}$, respectively, switch $S_{11}$ and switch $S_{21}$ are switched complimentary to each other by control system 84 such that switch $S_{11}$ and switch $S_{21}$ are never on at the same time to prevent a short circuit. To make sure a short circuit is never present, control system 84 incorporates a delay time τ between switching off switch $S_{11}$ and switching on switch $S_{21}$ and between switching off switch $S_{21}$ and switching on switch $S_{11}$. The complementary switching and delay time control may be extrapolated to switches $S_{31}$, $S_{41}$ of bridge leg 26; switches $S_{12}$, $S_{22}$ of bridge leg 44; and switches $S_{32}$, $S_{42}$ of bridge leg 44.

Referring still to FIG. 3, a current waveform 94 for $i_{c1}$ is shown. Zero voltage switching is possible by gating on switches of the inverter 12 (in this case, switches $S_{11}$, $S_{21}$ of bridge leg 24) while the switches' antiparallel diodes (in this case, antiparallel diodes 32, 34 of bridge leg 24) are conducting. Therefore, zero voltage switching is possible in bridge leg 24 by switching switch $S_{11}$ on when $i_{c1}$ is negative, for example, at point $I_1$ on current waveform 94, and by switching switch $S_{21}$ on when $i_{c1}$ is positive, for example, at point $I_2$ on current waveform 94. The zero voltage switching control configuration may be extrapolated to bridge legs 26, 44, 46 by using current waveforms similar to current waveform 94 for currents flowing from nodes 72, 78, 82 of bridge legs 26, 44, 46.

A phase shift angle control configuration in accordance with an embodiment of the invention will now be described with reference to bridge legs 24, 26 of phase leg 20 of inverter 12 of power inversion system 10 and inductor 64. While reference is made only to one phase leg 20 of inverter 12 and inductor 14, the details of the phase shift angle control configuration may be extrapolated to the other phase leg 22 of inverter 12 and inductor 16.

Figure 4:
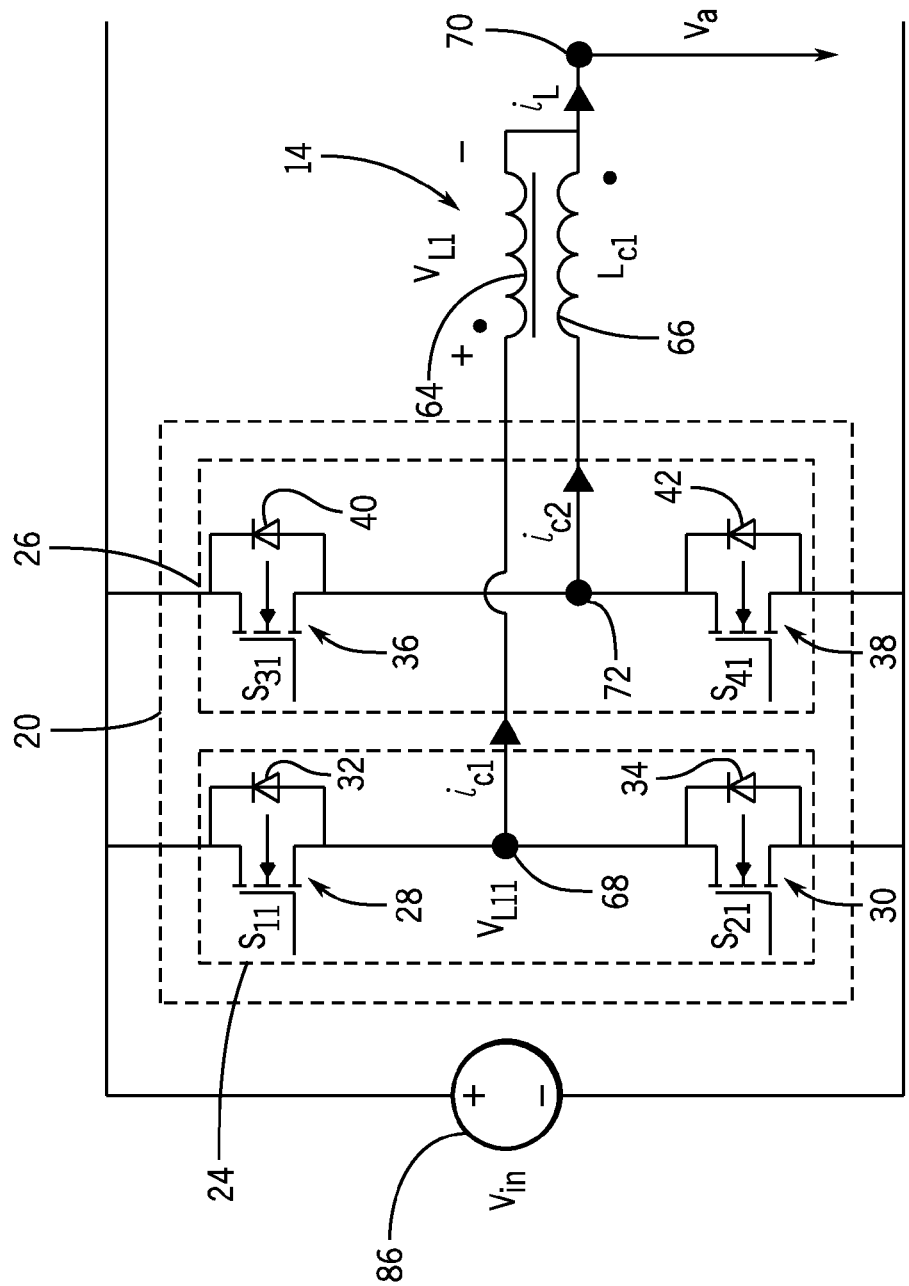
FIG. 4 is a schematic of a phase leg of the inverter of FIG. 1, according to an embodiment of the invention.

Referring now to FIG. 4, phase leg 20 of inverter 12 and inductor 14 of power inversion system 10 and DC power source 86 are shown. Bridge leg 24 provides for a current $i_{c1}$ flowing between nodes 68, 70 through inductor 64 during operation of power inversion system 10. Bridge leg 24 also provides for a voltage $V_{L11}$ at node 68 during operation of power inversion system 10. Bridge leg 26 provides for a current $i_{c2}$ flowing between nodes 70, 72 through inductor 66 during operation of power inversion system 10. A voltage $V_{L1}$ is present across inductor 64. A voltage $V_a$ and a current $i_L$ is provided at node 70 during operation of power inversion system 10.

Figure 5C:
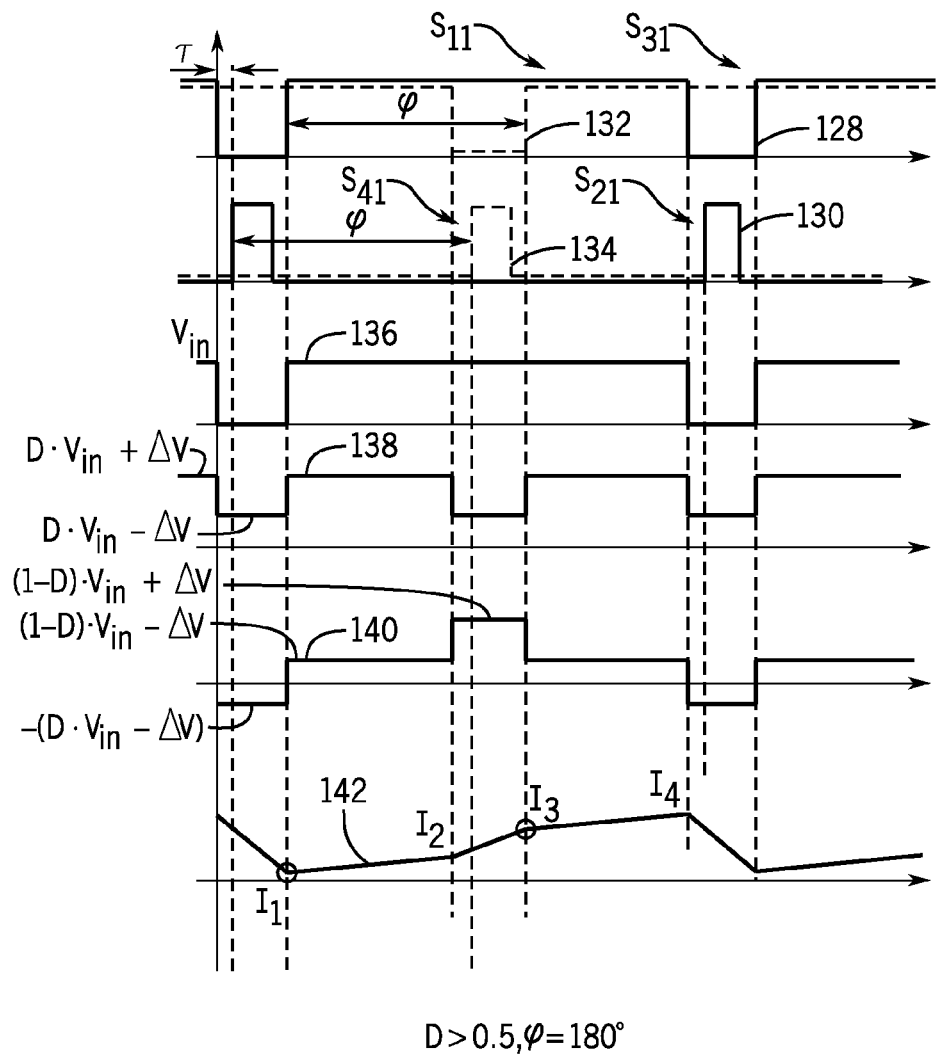

Referring now to FIGS. 5A-5C and 6A-6B, known control schemes for a phase shift angle of 180 degrees are shown in FIGS. 5A-5C, and inventive control schemes for a phase shift angle other than 180 degrees (for example, 36 degrees) are shown in FIGS. 6A-6B. The known control schemes are shown with the inventive control schemes for purposes of comparison.

Referring now to FIGS. 5A-5C, diagrams of the operation of phase leg 20 of FIG. 4 with a phase shift angle φ of 180 degrees and varying D are shown according to an embodiment of the invention. Referring to FIG. 5A, a diagram of the operation of phase leg 20 of FIG. 4 with phase shift angle φ of 180 degrees and D less than 0.5 (50%) is shown according to an embodiment of the invention. Switching waveforms 96, 98, 100, 102 correspond to switches $S_{11}$, $S_{21}$, $S_{31}$, $S_{41}$, respectively. As shown, switches $S_{11}$, $S_{21}$ and switches $S_{31}$, $S_{41}$ complement each other such that switch $S_{11}$ is never switched on at the same time as switch $S_{21}$ and switch $S_{31}$ is never switched on at the same time as switch $S_{41}$ to prevent short circuits. To make sure a short circuit is never present, control system 84 incorporates a delay time τ between switching off switch $S_{11}$ and switching on switch $S_{21}$, between switching off switch $S_{21}$ and switching on switch $S_{11}$, between switching off switch $S_{31}$ and switching on switch $S_{41}$, and between switching off switch $S_{41}$ and switching on switch $S_{31}$.

Voltage waveform 104 corresponds to voltage $V_{L11}$ at node 68 in FIG. 4 during operation of power inversion system 10. As shown, voltage $V_{L11}$ ranges in voltage from 0V to $V_{in}$ (voltage of DC power source 86). Voltage $V_{L11}$ is at $V_{in}$ when switch $S_{11}$ is switched on. Otherwise, voltage $V_{L11}$ is at 0V. Voltage waveform 106 corresponds to voltage $V_a$ at node 70 in FIG. 4 during operation of power inversion system 10. As shown, voltage $V_a$ ranges in voltage from $D*V_{in}+\Delta V$ to $D*V_{in}-\Delta V$, where $\Delta V$ is $0.5*L_{c1}*(diL/dt)$. Voltage $V_a$ is at $D*V_{in}+\Delta V$ when switch $S_{11}$ or switch $S_{31}$ is switched on. Otherwise, voltage $V_a$ is at $D*V_{in}-\Delta V$. Voltage waveform 108 corresponds to voltage $V_{L1}$ across inductor 64 in FIG. 4 during operation of power inversion system 10. Voltage $V_{L1}$ ranges in voltage from $-(D*V_{in}+\Delta V)$ to $(1-D)*Vin-\Delta V$. As shown, voltage $V_{L1}$ is at $(1-D)*V_{in}-\Delta V$ when switch $S_{11}$ is switched on. Voltage $V_{L1}$ is at $-(D*V_{in}+\Delta V)$ when switch $S_{31}$ is switched on. When switch $S_{11}$ and switch $S_{31}$ are both switched off, voltage $V_{L1}$ is at $-(D*V_{in}-\Delta V)$.

Current waveform 110 corresponds to $i_{c1}$ flowing between nodes 68, 70 through inductor 64 during operation of power inversion system 10. As shown, $i_{c1}$ is negative current at all times during operation of power inversion system 10 when D is less than 0.5 (50%). When $i_{c1}$ is at point $I_1$, switch $S_{11}$ is switched on for zero voltage switching as described above with respect to FIG. 3. $i_{c1}$ begins to increase after point $I_1$. However, switch $S_{11}$ is switched off when $i_{c1}$ is at point $I_2$ before $i_{c1}$ increases to a positive level. Therefore, when switch $S_{21}$ is switched on after delay time τ, zero voltage switching is not possible. This is because switch $S_{21}$'s antiparallel diode 34 is not conducting when $i_{c1}$ is negative. As stated above with respect to FIG. 3, zero voltage switching is possible by gating on switches of the inverter 12 while the switches' antiparallel diodes are conducting, and switch $S_{21}$'s antiparallel diode 34 is conducting when $i_{c1}$ is positive. After switch $S_{11}$ is switched off at point $I_2$, $i_{c1}$ decreases at a first decreasing rate until point $I_3$ when switch $S_{31}$ is switched on (while $S_{21}$ is switched on), at which point $i_{c1}$ starts to decrease at a second, faster decreasing rate. At point $I_4$, switch $S_{31}$ is switched off, and $i_{c1}$ resumes decreasing at the first rate. Current waveform 110 repeats this pattern when switch $S_{11}$ is switched on again.

The analysis performed on bridge leg 24 of phase 20 of inverter 12 of power inversion system 10 showing that zero voltage switching is not possible for switch $S_{21}$ when D is less than 0.5 (50%) and the phase shift angle is 180 degrees, may be extrapolated to bridge legs 26, 44, 46 by analyzing current waveforms similar to current waveform 110. The current waveforms for bridge legs 26, 44, 46 would be corresponding to a current flowing between nodes 70, 72 through inductor 66, a current flowing between nodes 78, 80 through inductor 74, and a current flowing between nodes 80, 82 through inductor 76, respectively.

Referring to FIG. 5B, a diagram of the operation of phase leg 20 of FIG. 4 with phase shift angle φ of 180 degrees and D equal to 0.5 (50%) is shown according to an embodiment of the invention. Switching waveforms 112, 114, 116, 118 correspond to switches $S_{11}$, $S_{21}$, $S_{31}$, $S_{41}$, respectively. As shown, switches $S_{11}$, $S_{21}$ and switches $S_{31}$, $S_{41}$ complement each other such that switch $S_{11}$ is never switched on at the same time as switch $S_{21}$ and switch $S_{31}$ is never switched on at the same time as switch $S_{41}$ to prevent short circuits. To make sure a short circuit is never present, control system 84 incorporates a delay time τ between switching off switch $S_{11}$ and switching on switch $S_{21}$, between switching off switch $S_{21}$ and switching on switch $S_{11}$, between switching off switch $S_{31}$ and switching on switch $S_{41}$, and between switching off switch $S_{41}$ and switching on switch $S_{31}$.

Voltage waveform 120 corresponds to voltage $V_{L11}$ at node 68 in FIG. 4 during operation of power inversion system 10. As shown, voltage $V_{L11}$ ranges in voltage from 0V to $V_{in}$ (voltage of DC power source 86). Voltage $V_{L11}$ is at $V_{in}$ when switch $S_{11}$ and switch $S_{41}$ are both switched on and during the delay time τ between switching off switches $S_{11}$, $S_{41}$ and switching on switches $S_{21}$, $S_{31}$. Otherwise, voltage $V_{L11}$ is at 0V. Voltage waveform 122 corresponds to voltage $V_a$ at node 70 in FIG. 4 during operation of power inversion system 10. As shown, voltage $V_a$ is at $V_{in}/2$ at all times. Voltage waveform 124 corresponds to voltage $V_{L1}$ across inductor 64 in FIG. 4 during operation of power inversion system 10. Voltage $V_{L1}$ ranges in voltage from $V_{in}/2$ to $-V_{in}/2$. As shown, voltage $V_{L1}$ is at $V_{in}/2$ when switch $S_{11}$ and switch $S_{41}$ are both switched on and during the delay time τ between switching off switches $S_{11}$, $S_{41}$ and switching on switches $S_{21}$, $S_{31}$. Otherwise, voltage $V_{L1}$ is at $-V_{in}/2$.

Current waveform 126 corresponds to $i_{c1}$ flowing between nodes 68, 70 through inductor 64 during operation of power inversion system 10. As shown, $i_{c1}$ is increases and decreases at a constant rate during operation of power inversion system 10 when D is equal to 0.5 (50%). $i_{c1}$ starts to increase from a negative value when switches $S_{11}$, $S_{41}$ are switched on and continues to increase through delay time τ after switches $S_{11}$, $S_{41}$ are switched off $i_{c1}$ starts to decrease from a positive value when switches $S_{21}$, $S_{31}$ are switched on and continues to decrease through delay time τ after switches $S_{21}$, $S_{31}$ are switched off. Because $i_{c1}$ is negative when switch $S_{11}$ is switched on and positive when $S_{21}$ is switched on, zero voltage switching is always possible. This is because antiparallel diode 32 conducts when $i_{c1}$ is negative and antiparallel diode 34 conducts when $i_{c1}$ is positive.

The analysis performed on bridge leg 24 of phase 20 of inverter 12 of power inversion system 10 showing that zero voltage switching is not possible for switch $S_{21}$ when D is equal to 0.5 (50%) and the phase shift angle is 180 degrees, may be extrapolated to bridge legs 26, 44, 46 by analyzing current waveforms similar to current waveform 110. The current waveforms for bridge legs 26, 44, 46 would be corresponding to a current flowing between nodes 70, 72 through inductor 66, a current flowing between nodes 78, 80 through inductor 74, and a current flowing between nodes 80, 82 through inductor 76, respectively.

Referring to FIG. 5C, a diagram of the operation of phase leg 20 of FIG. 4 with phase shift angle φ of 180 degrees and D greater than 0.5 (50%) is shown according to an embodiment of the invention. Switching waveforms 128, 130, 132, 134 correspond to switches $S_{11}$, $S_{21}$, $S_{31}$, $S_{41}$, respectively. As shown, switches $S_{11}$, $S_{21}$ and switches $S_{31}$, $S_{41}$ complement each other such that switch $S_{11}$ is never switched on at the same time as switch $S_{21}$ and switch $S_{31}$ is never switched on at the same time as switch $S_{41}$ to prevent short circuits. To make sure a short circuit is never present, control system 84 incorporates a delay time τ between switching off switch $S_{11}$ and switching on switch $S_{21}$, between switching off switch $S_{21}$ and switching on switch $S_{11}$, between switching off switch $S_{31}$ and switching on switch $S_{41}$, and between switching off switch $S_{41}$ and switching on switch $S_{31}$.

Voltage waveform 136 corresponds to voltage $V_{L11}$ at node 68 in FIG. 4 during operation of power inversion system 10. As shown, voltage $V_{L11}$ ranges in voltage from 0V to $V_{in}$ (voltage of DC power source 86). Voltage $V_{L11}$ is at $V_{in}$ when switch $S_{11}$ is switched on. Otherwise, voltage $V_{L11}$ is at 0V. Voltage waveform 138 corresponds to voltage $V_a$ at node 70 in FIG. 4 during operation of power inversion system 10. As shown, voltage $V_a$ ranges in voltage from $D*V_{in}+\Delta V$ to $D*V_{in}-\Delta V$, wherein $\Delta V$ is $0.5*L_{c1}*(diL/dt)$. Voltage $V_a$ is at $D*V_{in}+\Delta V$ when switch $S_{11}$ and switch $S_{31}$ are both switched on. Voltage $V_a$ is at $D*V_{in}-\Delta V$ if either switch $S_{11}$ is switched on and switch $S_{31}$ is switched off or switch $S_{31}$ is switched on and switch $S_{11}$ is switched off. Voltage waveform 140 corresponds to voltage $V_{L1}$ across inductor 64 in FIG. 4 during operation of power inversion system 10. Voltage $V_{L1}$ ranges in voltage from $(1-D)*V_{in}+\Delta V$ to $-(D*V_{in}-\Delta V)$. As shown, voltage $V_{L1}$ is at $(1-D)*V_{in}+\Delta V$ when switch $S_{11}$ is switched on and switch $S_{31}$ is switched off. Voltage $V_{L1}$ is at $-(D*V_{in}-\Delta V)$ when switch $S_{11}$ is switched off and switch $S_{31}$ is switched on. When switch $S_{11}$ and switch $S_{31}$ are both switched on, voltage $V_{L1}$ is at $(1-D)*V_{in}-\Delta V$.

Current waveform 142 corresponds to $i_{c1}$ flowing between nodes 68, 70 through inductor 64 during operation of power inversion system 10. As shown, $i_{c1}$ is positive current at all times during operation of power inversion system 10 when D is greater than 0.5 (50%). When $i_{c1}$ is at point $I_1$, switch $S_{11}$ is switched on (while switch $S_{31}$ is switched on), and $i_{c1}$ starts to increase at a first increasing rate. However, as explained above with reference to FIG. 3, because $i_{c1}$ is positive at point $I_1$, zero voltage switching is not possible. This is because zero voltage switching is possible by gating on switches of the inverter 12 while the switches' antiparallel diodes are conducting, and switch $S_{11}$'s antiparallel diode 32 is conducting when $i_{c1}$ is negative. After switch $S_{31}$ is switched off at point $I_2$, $i_{c1}$ increases at a second, faster increasing rate until point $I_3$ when switch $S_{31}$ is switched back on (while $S_{11}$ is switched on), at which point $i_{c1}$ starts to increase at the first increasing rate. At point $I_4$, switch $S_{11}$ is switched off, and $i_{c1}$ starts decreasing until switch $S_{11}$ is switched back on, at which point the pattern is repeated.

The analysis performed on bridge leg 24 of phase 20 of inverter 12 of power inversion system 10 showing that zero voltage switching is not possible for switch $S_{21}$ when D is greater than 0.5 (50%) and the phase shift angle φ is 180 degrees, may be extrapolated to bridge legs 26, 44, 46 by analyzing current waveforms similar to current waveform 142. The current waveforms for bridge legs 26, 44, 46 would be corresponding to a current flowing between nodes 70, 72 through inductor 66, a current flowing between nodes 78, 80 through inductor 74, and a current flowing between nodes 80, 82 through inductor 76, respectively.

As shown in FIGS. 5A-5C, with phase shift angle φ of 180 degrees, zero voltage switching is possible for some, but not all, of the switches in FIG. 4 when D is anything other than 0.5 (50%). In other words, at least one of the switches is in a hard switching control configuration when D is less than or greater than 0.5 (50%). In FIG. 5A, switch $S_{21}$ is in a hard switching control configuration because $i_{c1}$ is always negative. In FIG. 5C, switch $S_{11}$ is in a hard switching control configuration because $i_{c1}$ is always positive. However, as shown below with reference to FIGS. 6A-6B, zero voltage switching is possible when D is less than or greater than 0.5 (50%) with an optimized phase shift angle.

Referring now to FIGS. 6A-6B, diagrams of the operation of phase leg 20 of FIG. 4 with a phase shift angle φ of 36 degrees and varying D are shown according to an embodiment of the invention. Referring to FIG. 6A, a diagram of the operation of phase leg 20 of FIG. 4 with phase shift angle φ of 36 degrees and D less than 0.5 (50%) is shown according to an embodiment of the invention. Switching waveforms 144, 146, 148, 150 correspond to switches $S_{11}$, $S_{21}$, $S_{31}$, $S_{41}$, respectively. As shown, switches $S_{11}$, $S_{21}$ and switches $S_{31}$, $S_{41}$ complement each other such that switch $S_{11}$ is never switched on at the same time as switch $S_{21}$ and switch $S_{31}$ is never switched on at the same time as switch $S_{41}$ to prevent short circuits. To make sure a short circuit is never present, control system 84 incorporates a delay time T between switching off switch $S_{11}$ and switching on switch $S_{21}$, between switching off switch $S_{21}$ and switching on switch $S_{11}$, between switching off switch $S_{31}$ and switching on switch $S_{41}$, and between switching off switch $S_{41}$ and switching on switch $S_{31}$.

Voltage waveform 152 corresponds to voltage $V_{L11}$ at node 68 in FIG. 4 during operation of power inversion system 10. As shown, voltage $V_{L11}$ ranges in voltage from 0V to $V_{in}$ (voltage of DC power source 86). Voltage $V_{L11}$ is at $V_{in}$ when switch $S_{11}$ is switched on. Otherwise, voltage $V_{L11}$ is at 0V. Voltage waveform 154 corresponds to voltage $V_a$ at node 70 in FIG. 4 during operation of power inversion system 10. As shown, voltage $V_a$ ranges in voltage from $D*V_{in}+\Delta V$ to $D*V_{in}-\Delta V$, where $\Delta V$ is $0.5*L_{c1}*(diL/dt)$. Voltage $V_a$ is at $D*V_{in}+\Delta V$ when switch $S_{11}$ and switch $S_{31}$ are both switched on. Voltage $V_a$ is at $D*V_{in}-\Delta V$ when switch $S_{11}$ and switch $S_{31}$ are both switched off. Voltage $V_a$ is at $D*V_{in}$ when either switch $S_{11}$ is switched on and switch $S_{31}$ is switched off or switch $S_{31}$ is switched on and switch $S_{11}$ is switched off. Voltage waveform 156 corresponds to voltage $V_{L1}$ across inductor 64 in FIG. 4 during operation of power inversion system 10. Voltage $V_{L1}$ ranges in voltage from $(1-D)*V_{in}+\Delta V$ to $-(D*V_{in}+\Delta V)$. As shown, voltage $V_{L1}$ is at $(1-D)*V_{in}+\Delta V$ when switch $S_{11}$ is switched on and switch $S_{31}$ is switched off. Voltage $V_{L1}$ is at $-(D*V_{in}+\Delta V)$ when switch $S_{31}$ is switched on and switch $S_{11}$ is switched off. When switch $S_{11}$ and switch $S_{31}$ are both switched off, voltage $V_{L1}$ is at $-(D*V_{in}-\Delta V)$. When switch $S_{11}$ and switch $S_{31}$ are both switched on, voltage $V_{L1}$ is at $(1-D)*V_{in}-\Delta V$.

Current waveform 158 corresponds to $i_{c1}$ flowing between nodes 68, 70 through inductor 64 during operation of power inversion system 10. As shown, $i_{c1}$ ranges from negative current to positive current during operation of power inversion system 10 when D is less than 0.5 (50%) and the phase shift angle $\phi$ is less than 180 degrees. When $i_{c1}$ is negative at point $I_1$, switch $S_{11}$ is switched on for zero voltage switching as described above with respect to FIG. 3. $i_{c1}$ increases at a first increasing rate until point $I_2$, at which point switch $S_{31}$ is switched on and $i_{c1}$ increases at a second, slower increasing rate until point $I_3$. Switch $S_{11}$ is switched off at point $I_3$, when $i_{c1}$ is at a positive level. After point $I_3$, $i_{c1}$ begins to decrease at a first decreasing rate. After delay time $\tau$, switch $S_{21}$ is switched on while $i_{c1}$ is still at a positive level. Therefore, when switch $S_{21}$ is switched on after delay time $\tau$, zero voltage switching is possible, as described with reference to FIG. 3. $i_{c1}$ decreases after point $I_3$ until point $I_4$, when switch $S_{31}$ is switched off. After point $I_4$, $i_{c1}$ decreases at a second, slower decreasing rate until switch $S_{11}$ is switched on and current waveform 158 repeats this pattern. Switching waveforms 144, 146 and current waveform 158 show that zero voltage switching is always possible when D is less than 0.5 (50%) and phase shift angle $\phi$ is less than 180 degrees. This is because antiparallel diode 32 corresponding to switch $S_{11}$ conducts when $i_{c1}$ is negative and antiparallel diode 34 corresponding to switch $S_{21}$ conducts when $i_{c1}$ is positive.

The analysis performed on bridge leg 24 of phase 20 of inverter 12 of power inversion system 10 showing that zero voltage switching is always possible for both switch $S_{11}$ and switch $S_{21}$ when D is less than 0.5 (50%) and phase shift angle $\phi$ is less than 180 degrees, may be extrapolated to bridge legs 26, 44, 46 by analyzing current waveforms similar to current waveform 158. The current waveforms for bridge legs 26, 44, 46 would be corresponding to a current flowing between nodes 70, 72 through inductor 66, a current flowing between nodes 78, 80 through inductor 74, and a current flowing between nodes 80, 82 through inductor 76, respectively.

Referring to FIG. 6B, a diagram of the operation of phase leg 20 of FIG. 4 with phase shift angle $\phi$ of 36 degrees and D greater than 0.5 (50%) is shown according to an embodiment of the invention. Switching waveforms 160, 162, 164, 166 correspond to switches $S_{11}$, $S_{21}$, $S_{31}$, $S_{41}$, respectively. As shown, switches $S_{11}$, $S_{21}$ and switches $S_{31}$, $S_{41}$ complement each other such that switch $S_{11}$ is never switched on at the same time as switch $S_{21}$ and switch $S_{31}$ is never switched on at the same time as switch $S_{41}$ to prevent short circuits. To make sure a short circuit is never present, control system 84 incorporates a delay time $\tau$ between switching off switch $S_{11}$ and switching on switch $S_{21}$, between switching off switch $S_{21}$ and switching on switch $S_{11}$, between switching off switch $S_{31}$ and switching on switch $S_{41}$, and between switching off switch $S_{41}$ and switching on switch $S_{31}$.

Voltage waveform 168 corresponds to voltage $V_{L11}$ at node 68 in FIG. 4 during operation of power inversion system 10. As shown, voltage $V_{L11}$ ranges in voltage from 0V to $V_{in}$ (voltage of DC power source 86). Voltage $V_{L11}$ is at $V_{in}$ when switch $S_{11}$ is switched on. Otherwise, voltage $V_{L11}$ is at 0V. Voltage waveform 170 corresponds to voltage $V_a$ at node 70 in FIG. 4 during operation of power inversion system 10. As shown, voltage $V_a$ ranges in voltage from $D*V_{in}+\Delta V$ to $D*V_{in}-\Delta V$. Voltage $V_a$ is at $D*V_{in}+\Delta V$ when switch $S_{11}$ and switch $S_{31}$ are both switched on. Voltage $V_a$ is at $D*V_{in}$ if either switch $S_{11}$ is switched on and $S_{31}$ is switched off or switch $S_{31}$ is switched on and switch $S_{11}$ is switched off. When switch $S_{11}$ and switch $S_{31}$ are both switched off, voltage $V_a$ is at $D*V_{in}-\Delta V$. Voltage waveform 172 corresponds to voltage $V_{L1}$ across inductor 64 in FIG. 4 during operation of power inversion system 10. Voltage $V_{L1}$ ranges in voltage from $(1-D)*V_{in}+\Delta V$ to $-(D*V_{in}+\Delta V)$. As shown, voltage $V_{L1}$ is at $(1'D)*V_{in}+\Delta V$ when switch $S_{11}$ is switched on and switch $S_{31}$ is switched off. Voltage $V_{L1}$ is at $-(D*V_{in}+\Delta V)$ when switch $S_{11}$ is switched off and switch $S_{31}$ is switched on. Voltage $V_{L1}$ is at $(1-D)*V_{in}-\Delta V$ when both switch $S_{11}$ and switch $S_{31}$ are switched on. When both switch $S_{11}$ and switch $S_{31}$ are both switched off, $V_{L1}$ is at $-(D*V_{in}-\Delta V)$.

Current waveform 174 corresponds to $i_{c1}$ flowing between nodes 68, 70 through inductor 64 during operation of power inversion system 10. As shown, $i_{c1}$ ranges from negative current to positive current during operation of power inversion system 10 when D is greater than 0.5 (50%) and phase shift angle $\phi$ is less than 180 degrees. When $i_{c1}$ is negative at point $I_1$, switch $S_{11}$ is switched on for zero voltage switching as described with reference to FIG. 3, and $i_{c1}$ starts to increase at a first increasing rate. After switch $S_{31}$ is switched on at point $I_2$, $i_{c1}$ increases at a second, slower increasing rate until point $I_3$ when switch $S_{11}$ is switched off, at which point $i_{c1}$ starts to decrease at a first decreasing rate until point $I_4$. While $i_{c1}$ is still positive, switch $S_{21}$ is switched on after point $I_3$ after delay time $\tau$. Because $i_{c1}$ is still positive when switch $S_{21}$, zero voltage switching is possible. At point $I_4$, switch $S_{31}$ is switched off, and $i_{c1}$ starts decreasing at a second, slower decreasing rate until switch $S_{11}$ is switched back on, at which point current waveform 174 repeats the above-described pattern. Switching waveforms 160, 162 and current waveform 174 show that zero voltage switching is always possible when D is greater than 0.5 (50%) and phase shift angle $\phi$ is less than 180 degrees. This is because antiparallel diode 32 corresponding to switch $S_{11}$ conducts when $i_{c1}$ is negative and antiparallel diode 34 corresponding to switch $S_{21}$ conducts when $i_{c1}$ is positive.

The analysis performed on bridge leg 24 of phase 20 of inverter 12 of power inversion system 10 showing that zero voltage switching is always possible for both switch $S_{11}$ and switch $S_{21}$ when D is greater than 0.5 (50%) and phase shift angle $\phi$ is less than 180 degrees, may be extrapolated to bridge legs 26, 44, 46 by analyzing current waveforms similar to current waveform 174. The current waveforms for bridge legs 26, 44, 46 would be corresponding to a current flowing between nodes 70, 72 through inductor 66, a current flowing between nodes 78, 80 through inductor 74, and a current flowing between nodes 80, 82 through inductor 76, respectively.

As shown in FIGS. 6A-6B, with a phase shift angle $\phi$ of 36 degrees, zero voltage switching is always possible for the switches in FIG. 4 when D is less than or greater than 0.5 (50%). In other words, switch $S_{11}$ and switch $S_{21}$ are not in a hard switching control configuration when D is less than or greater than 0.5 (50%) and phase shift angle $\phi$ is less than 180 degrees. In both FIGS. 6A and 6B, switch $S_{11}$ is always in a zero voltage switching control configuration because switch $S_{11}$ only switches on when $i_{c1}$ is negative, and switch $S_{21}$ is always in a zero voltage switching control configuration because $i_{c1}$ is always negative. While FIGS. 6A and 6B specifically provide diagrams of the operation of phase leg 20 of FIG. 4 with a phase shift angle ϕ of 36 degrees (for varying D), it is recognized that similar voltage and current waveforms would result from implementation of a phase shift angle ϕ less than 180 degrees but other than 36 degrees, and thus the specific phase shift angle of 36 degrees is provided only as an example.

Now referring to FIGS. 7A-B, diagrams of the hard switching zone for phase leg 20 of FIG. 4 for a phase shift angle ϕ of 180 degrees and a phase shift angle ϕ of 18 degrees are shown for purposes of comparison. Referring to FIG. 7A, a diagram of the hard switching zone for phase leg 20 of FIG. 4 for a phase shift angle ϕ of 180 degrees is shown. Current waveform 176 represents current $i_L$ from FIG. 4 ranging from about −1.0 amps to 1.0 amps over a period of 0.014 seconds. Waveform 178 represents the envelope of current $i_{c1}$ from FIG. 4 ranging from about 12.5 amps to −12.5 amps over a period of 0.014 seconds. Waveform 178 shows zero voltage switching zones 180 and hard switching zones 182. As can be seen, the zero voltage switching zones 180 and hard switching zones 182 take up about the same amount of time over the 0.014 seconds of switching displayed.

Referring to FIG. 7B, a diagram of the hard switching zone for phase leg 20 of FIG. 4 for a phase shift angle ϕ of 18 degrees is shown according to an embodiment of the invention. Current waveform 184 represents current $i_L$ from FIG. 4 ranging from about −1.0 amps to 1.0 amps over a period of 0.014 seconds. Waveform 186 represents the envelope of current $i_{c1}$ from FIG. 4 ranging from about 5 amps to −5 amps over a period of 0.014 seconds. Waveform 186 shows zero voltage switching zones 188 and hard switching zone 190. As can be seen, zero voltage switching zones 188 dominate the 0.014 seconds of switching displayed. Hard switching zone 190 is significantly smaller than hard switching zones 182 in FIG. 7A. Thus, operating switches $S_{11}, S_{21}, S_{31}, S_{41}, S_{12}, S_{22}, S_{32}, S_{42}$ of the inverter 12 with phase shift angle ϕ at 18 degrees reduces switching losses in power inversion system 10. However, waveform 186 still includes hard switching zone 190. Therefore a method for varying phase shift angle ϕ of the inverter 12 is described below with reference to FIG. 8.

Figure 8:
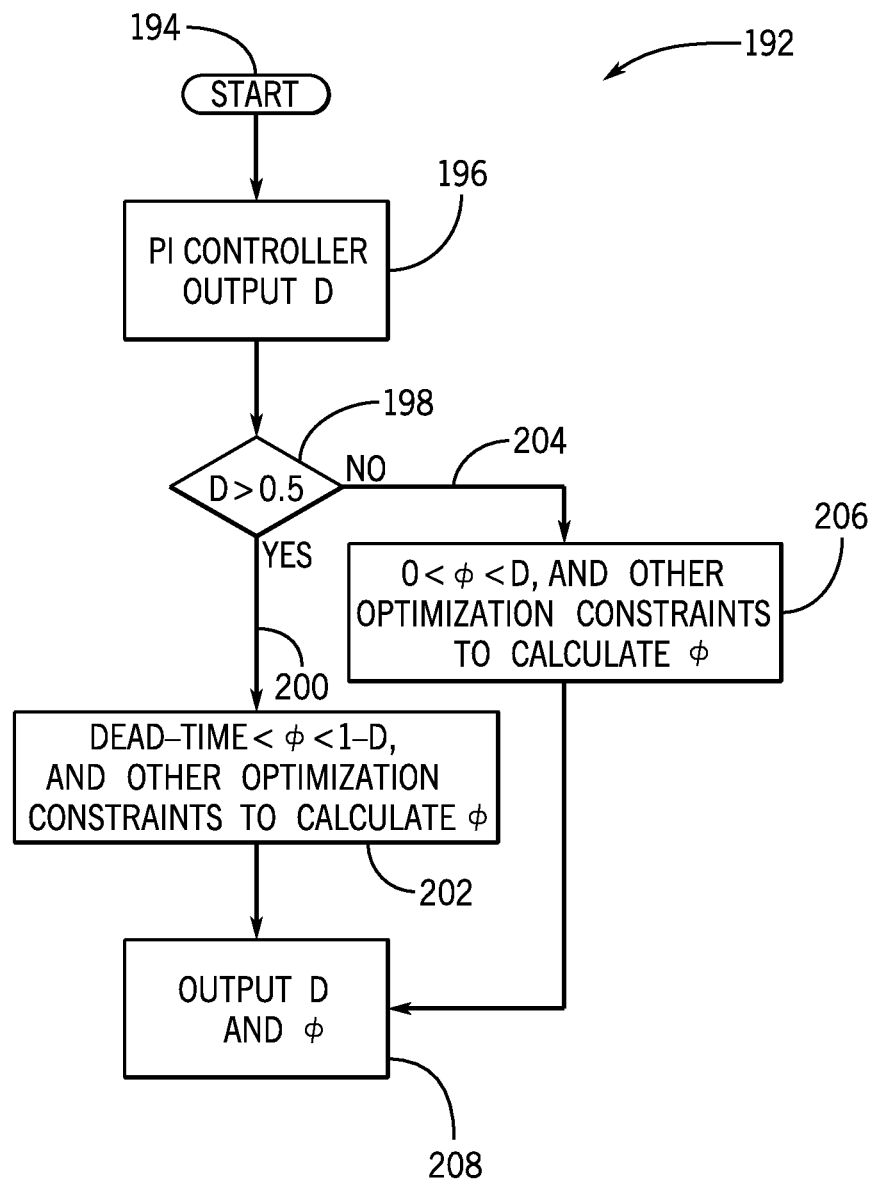
FIG. 8 is a block diagram of a method of operating the power inversion system of FIG. 1, according to an embodiment of the invention.

Referring now to FIG. 8, a technique 192 for operating the power inversion system 10 is shown, with technique 192 being performed by a control system in or associated with power inversion system 10, such as control system 84 according to an embodiment of the invention. Process 192 starts at STEP 194 when a DC power source, such as DC power source 86, is connected to power inversion system 10. At STEP 196, control system 84 outputs a modulation signal including D for driving inverter 12 to switches $S_{11}, S_{21}, S_{31}, S_{41}, S_{12}, S_{22}, S_{32}, S_{42}$. A determination is made at STEP 198 regarding whether D is greater than 0.5. If D is greater than 0.5, as indicated at 200, process 192 proceeds to STEP 202. At STEP 202, control system 84 optimizes a phase shift angle Φ based on at least the value of 1−D. Control system 84 may also optimize phase shift angle Φ using other constraints such as the dead-time for switching switches $S_{11}, S_{21}, S_{31}, S_{41}, S_{12}, S_{22}, S_{32}, S_{42}$. Therefore, control system 84 may optimize the phase shift angle Φ according to a lower bound of the dead-time of power inversion system 10 and an upper bound of 1−D (dead-time<Φ<1−D). In addition, other optimization constraints such as conditions related to inverter operating point or inverter design parameters or any operational constraints may be utilized by control system 84 to optimize the phase shift angle Φ. After control system 84 has optimized phase shift angle Φ at STEP 202, control system 84 outputs D and optimized phase shift angle Φ in a modulation signal to switches $S_{11}, S_{21}, S_{31}, S_{41}, S_{12}, S_{22}, S_{32}, S_{42}$ for driving inverter 12 at STEP 208.

If a determination is made at STEP 198 that D is less than or equal to 0.5, as indicated at 204, process 192 proceeds to STEP 206. At STEP 206, control system 84 optimizes phase shift angle Φ based on at least the value of D. Control system 84 may also optimize phase shift angle Φ using other constraints such as a zero boundary. Therefore, control system 84 may optimize the phase shift angle Φ according to a lower bound of zero and an upper bound of D (0<Φ<D), in addition to any other optimization constraints such as conditions related to inverter operating point or inverter design parameters or any operational constraints. In some embodiments, control system 84 may optimize phase shift angle Φ using a set look-up table of phase shift angles based on the modulation signal. After control system 84 has optimized phase shift angle Φ at STEP 206, control system 84 outputs D and optimized phase shift angle Φ in a modulation signal to switches $S_{11}, S_{21}, S_{31}, S_{41}, S_{12}, S_{22}, S_{32}, S_{42}$ for driving inverter 12 at STEP 208.

Beneficially, embodiments of the inventions thus provide a power inversion system including a control system with phase shift angle optimization control. The phase shift angle control may allow the power inversion system to operate at a phase shift angle less than 180 degrees—at a specific optimized angle that is determined to reduce switching losses for switches in an inverter. The phase shift angle optimization control may significantly reduce switching losses for switches in an inverter in the power inversion system such that the power inversion system may operate at a much higher switching frequency. The phase shift angle optimization control may also allow for an unlimited soft switching range with no diode reverse recovery loss. In other words, the phase shift angle optimization control may eliminate hard switching in the power inversion system. In addition, the phase shift angle optimization control may allow for a significant reduction in the power inversion system magnetics, such as LCL filter and inductor components. Further, the phase shift angle optimization control may not require extra analog-to-digital conversion components.

Therefore, according to one embodiment of the present invention, a power inversion system having an input coupleable to a DC power and an output coupleable to an AC load includes a power inverter including a plurality of phase legs, each phase leg including two bridge legs coupled in parallel, each bridge leg including at least two switch and antiparallel diode pairs coupled in series. The power inversion system also includes a plurality of inductors with at least one inductor coupled between a midpoint of each bridge leg and an LCL filter, the inductors in each phase leg being magnetically coupled. The power inversion system further includes a control system operable to drive the power inverter in a soft switching configuration, the control system programmed to output a switching signal to the power inverter according to a duty cycle and a phase shift angle, determine a value of the duty cycle, and optimize the phase shift angle of the power inverter based on the value of the duty cycle.

According to another embodiment of present invention, a method of operating an interleaved inverter includes inputting a DC power into the interleaved inverter and converting the DC power into an AC power with the interleaved inverter via a control system programmed to output a soft switching modulation signal to the plurality of switches of the interleaved inverter according to a duty cycle and a phase shift angle, identify the value of the duty cycle in the soft switching modulation signal, set the phase shift angle of the interleaved inverter using a first method if the duty cycle is less than or equal to 0.5 (50%), set the phase shift angle of the interleaved inverter using a second method different from the first method if the duty cycle is greater than 0.5 (50%). The method also includes outputting the AC power from the interleaved inverter to an AC load or AC grid.

According to yet another embodiment of the present invention, a control system for operating a power inverter is programmed to output a soft switching signal to the power inverter according to a duty cycle and a phase shift angle, determine the value of the duty cycle, and optimize the phase shift angle of the power inverter according to a first method if the duty cycle is less than or equal to 0.5 (50%) and according to a second method if the duty cycle is greater than 0.5 (50%).

The present invention has been described in terms of the preferred embodiment, and it is recognized that equivalents, alternatives, and modifications, aside from those expressly stated, are possible and within the scope of the appending claims.

What is claimed is:

1. A power inversion system including an input coupleable to a DC power and an output coupleable to an AC load, the power inversion system comprising:
   a power inverter including a plurality of phase legs, each phase leg including two bridge legs coupled in parallel, each bridge leg including at least two switch and antiparallel diode pairs coupled in series;
   a plurality of inductors, at least one inductor coupled between a midpoint of each bridge leg and an LCL filter, the inductors in each phase leg being magnetically coupled; and
   a control system operable to drive the power inverter in a soft switching configuration, the control system programmed to:
      output a switching signal to the power inverter according to a duty cycle and a phase shift angle;
      determine a value of the duty cycle; and
      optimize the phase shift angle of the power inverter based on the value of the duty cycle;
      wherein, in optimizing the phase shift angle, the control system is programmed to optimize the phase shift angle of the power inverter using a first method if the duty cycle is less than or equal to 0.5 (50%) and using a second method if the duty cycle is greater than 0.5 (50%) while maintaining the soft switching configuration of the inverter.

2. The power inversion system of claim 1 wherein, in optimizing the phase shift angle, the control system is programmed to:
   optimize the phase shift angle of the power inverter using a first set of optimization conditions when the duty cycle is less than or equal to 0.5, wherein the first set of optimization conditions comprises a zero boundary and the duty cycle; and
   optimize the phase shift angle of the power inverter using a second set of optimization conditions when the duty cycle, D, is greater than 0.5, wherein the second set of optimization conditions comprises at least one of a dead-time for the power inverter and a value equal to 1−D, conditions related to the power inverter operating point, power inverter design parameters, or power inverter operational constraints.

3. The power inversion system of claim 1 wherein the soft switching configuration is a zero voltage switching configuration.

4. The power inversion system of claim 3 wherein zero voltage switching is achieved by gating on the switches in each switch and antiparallel diode pair when the antiparallel diodes paired with the switches are conducting.

5. The power inversion system of claim 1 wherein the inverter includes at least four phase legs for providing a single phase AC power.

6. The power inversion system of claim 1 wherein the inverter includes at least six phase legs for providing a three phase AC power.

7. The power inversion system of claim 1 wherein the phase shift angle is optimized to be less than 180 degrees.

8. The power inversion system of claim 7 wherein the phase shift angle is optimized to achieve soft switching.

9. The power inversion system of claim 1 wherein the control system optimizes the phase shift angle of the power inverter based on D using a phase shift angle lookup table.

10. A method of operating an interleaved inverter comprising a plurality of switches, the method comprising:
    inputting a DC power into the interleaved inverter;
    converting the DC power into an AC power with the interleaved inverter via a control system programmed to:
       output a soft switching modulation signal to the plurality of switches of the interleaved inverter according to a duty cycle and a phase shift angle;
       identify the value of the duty cycle in the soft switching modulation signal; and
       set the phase shift angle of the interleaved inverter using a first method if the duty cycle is less than or equal to 0.5 (50%);
       set the phase shift angle of the interleaved inverter using a second method different from the first method if the duty cycle is greater than 0.5 (50%), and
    outputting the AC power from the interleaved inverter to an AC load or an AC grid.

11. The method of claim 10 wherein, in setting the phase shift angle using the first method, the method further comprises:
    determining a first set of optimization conditions for setting the phase shift angle when the duty cycle is less than or equal to 0.5, wherein the first set of optimization conditions comprises a zero boundary and the duty cycle; and
    optimizing the phase shift angle of the interleaved inverter using the first set of optimization conditions.

12. The method of claim 10 wherein, in setting the phase shift angle using the second method, the method further comprises:
    determining a second set of optimization conditions for setting the phase shift angle when the duty cycle, D, is greater than 0.5, wherein the second set of optimization conditions comprises a dead-time for the interleaved inverter and a value equal to 1−D; and
    optimizing the phase shift angle of the interleaved inverter using the second set of optimization conditions.

13. The method of claim 10 wherein setting the phase shift angle using one of the first and second methods sets the phase shift angle to less than 180 degrees.

14. The method of claim 13 wherein the setting the phase shift angle to less than 180 degrees regulates a circulation current through the interleaved inverter, so as to achieve a zero voltage switching configuration of the plurality of switches.

15. A control system for operating a power inverter, the control system programmed to:
output a soft switching signal to the power inverter according to a duty cycle and a phase shift angle;
determine the value of the duty cycle; and
optimize the phase shift angle of the power inverter according to a first method if the duty cycle is less than or equal to 0.5 (50%) and according to a second method if the duty cycle is greater than 0.5 (50%).

16. The control system of claim 15 wherein the soft switching signal is a zero voltage switching signal.

17. The control system of claim 15 wherein the phase shift angle is optimized to be less than 180 degrees.

18. The control system of claim 15 wherein the control system is programmed to:
optimize the phase shift angle of the power inverter using a first set of optimization conditions when the duty cycle is less than or equal to 0.5, wherein the first set of optimization conditions comprises a zero boundary and the duty cycle; and
optimize the phase shift angle of the power inverter using a second set of optimization conditions when the duty cycle, D, is greater than 0.5, wherein the second set of optimization conditions comprises a dead-time for the power inverter and a value equal to 1−D.

19. The control system of claim 15 wherein the control system is programmed to optimize the phase shift angle of the power inverter according to the first method using a first phase shift angle lookup table and according to the second method using a second phase shift angle lookup table.

* * * * *